Figure 1A:
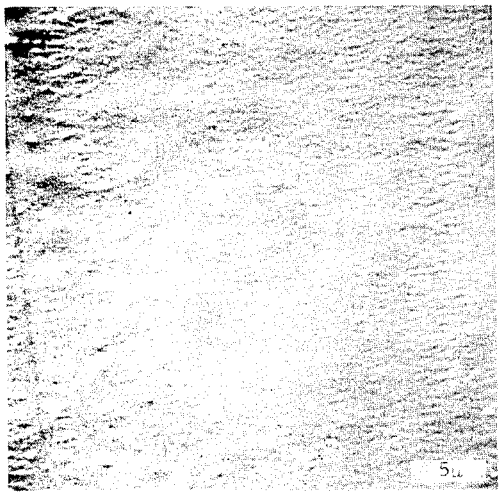

United States Patent [19]
Zimmerman et al.

[11] 3,880,966

[45] Apr. 29, 1975

[54] CORONA TREATED MICROPOROUS FILM

[75] Inventors: Daniel Zimmerman, East Brunswick; Stephen Schulze, Gillette; Stanley Wolfowitz, Union, all of N.J.

[73] Assignee: Celanese Corporation, New York, N.Y.

[22] Filed: Aug. 27, 1973

[21] Appl. No.: 391,912

Related U.S. Application Data

[63] Continuation of Ser. No. 183,128, Sept. 23, 1971, abandoned.

[52] U.S. Cl. .................... 264/25; 264/22; 264/156
[51] Int. Cl. ............................................. B29d 27/00
[58] Field of Search ......... 264/22, 25, 156, DIG. 70

[56] References Cited
UNITED STATES PATENTS

| | | | |
|---|---|---|---|
| 2,550,366 | 4/1951 | Meaker | 264/DIG. 70 |
| 2,994,617 | 8/1961 | Proctor | 264/156 X |
| 3,426,754 | 2/1969 | Bierenbaum | 128/156 |
| 3,471,597 | 10/1969 | Schirmer | 264/25 |

FOREIGN PATENTS OR APPLICATIONS 900,083   1962   United Kingdom .......... 264/DIG. 69

*Primary Examiner*—Richard R. Kucia
*Attorney, Agent, or Firm*—Thomas J. Morgan; Linn I. Grim; Marvin Bressler

[57] ABSTRACT

Crystalline elastic polymeric films having a crystallinity of at least 20 percent and an elastic recovery of at least 40 percent after subjection to a 50 percent extension at 25°C. and 65 percent relative humidity are subjected to a corona discharge treatment rendering the films permeable. The films are subsequently rendered microporous by stretching and heat setting operations to further increase permeability. Or this treatment to render the crystalline elastic film microporous may be first used on the film before the corona treatment. The films are useful as filters, flow control devices, and the like.

8 Claims, 5 Drawing Figures

SCANNING ELECTRON MICROGRAPHS OF MICROPOROUS POLYPROPYLENE FILM

Untreated control
(2600X)

Untreated control
(5500X)

SCANNING ELECTRON MICROGRAPHS OF MICROPOROUS POLYPROPYLENE FILM
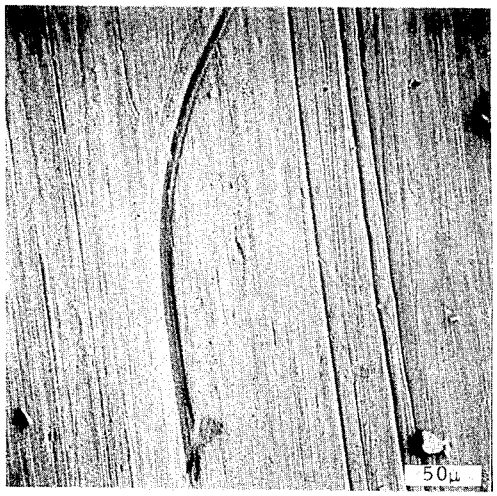
FIG. 2 Corona-treated film (264X)
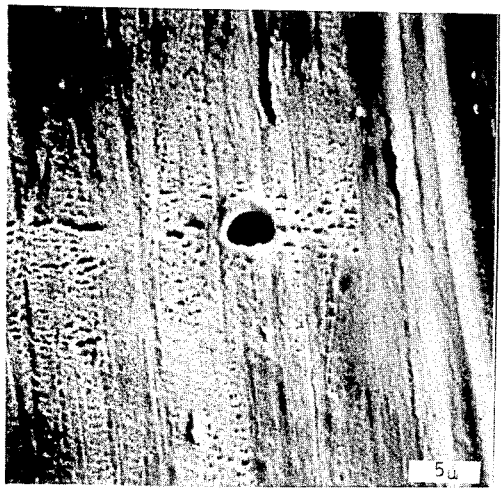
FIG. 3a (2600X)
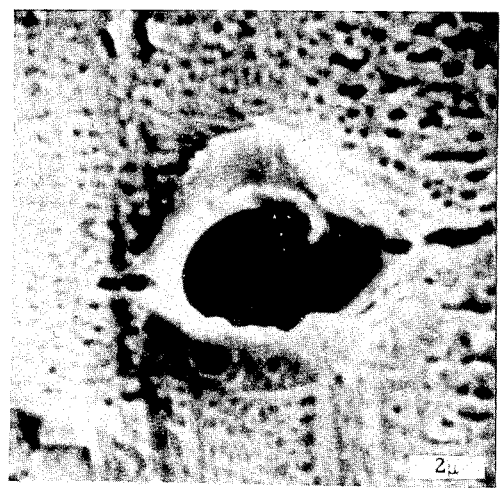
FIG. 3b (6600X)
Higher Magnifications of Holes at Top Right of FIG. 2
Inventors
Daniel Zimmerman
Stephen Schulze
Stanley Wolfowitz
By Kenneth E. Macklin
Attorney

CORONA TREATED MICROPOROUS FILM

This is a continuation, of application Ser. No. 183,128 filed Sept. 23, 1971 now abandoned.

This invention relates to a method of increasing permeability of crystalline elastic films to a point which is intermediate between the permeability of prior art microporous films (as described hereinafter) and the permeability of porous films such as pin-punched or corona perforated polyolefin films. Microporous polyolefin films of the type described in U.S. Pat. No. 3,558,764 issued on Jan. 26, 1971, U.S. Pat. No. 3,679,538 issued on July 25, 1972, and copending U.S. application Ser. No. 104,715 filed on Jan. 7, 1971 find many varying usages. However, because of the smallness of the pore sizes and the resulting low permeability of the films, it has been difficult or impossible to utilize these films for certain applications requiring higher permeabilities.

It has been proposed in U.S. Pat. No. 3,471,597 to perforate standard non-elastic non-porous polyolefinic films using the action of a corona discharge. However, the perforation of such films requires the use of relatively high voltage electricity and because of this requirement the pore size and permeability of the resulting films is quite large, rendering these films undesirably permeable to all manner of relatively large sized particles.

By means of this invention a technique has been developed for producing films which exhibit increased permeability and pore sizes over previously described microporous films, to a degree that is intermediate between the relatively low permeability and small pore size of normal microporous films and the high permeability and large pore size of corona perforated non-porous films.

Generally the instant invention involves the corona discharge treatment of a crystalline elastic polymeric film with sufficient relatively low voltage electricity for a time sufficient to increase the permeability of the film. The starting film should have a crystallinity of at least 20 percent and an elastic recovery of at least 40 percent after subjection to a 50 percent extension at 25°C. and 65 percent relative humidity. The films to be used in the process of this invention can be either the precursor films for the microporous films or the microporous films themselves, which are hereinafter described. The corona-treated precursor films are subjected to a process to render them microporous, with a consequent increase in permeability of the film.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The microporous films useful in the present invention are of the latter type.

The microporous films useful in the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25°C. and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949).

Porous films have been produced which possess a microporous, open-celled structure, and which are also characterized by a reduced bulk density. Films possessing this microporous structure are described, for example, in U.S. Pat. No. 3,426,754. The preferred method of preparation described therein involves drawing or stretching at ambient temperatures, i.e., "cold drawing", a crystalline, elastic starting film in an amount of about 10 to 300 percent of its original length, with subsequent stabilization by heat setting of the drawn film under a tension such that the film is not free to shrink or can shrink only to a limited extent.

While the above described microporous or void-containing film of the prior art is useful in certain applications, the search has continued for new processes able to produce open-celled microporous films having a greater number of pores, a more uniform pore concentration or distribution, a larger total pore area, and better thermal stability of the porous film. These properties are significant in applications such as filter media where a large number of uniformly distributed pores are necessary or highly desirable; and in applications such as breathable medical dressings subject to high temperatures, e.g., sterilization temperatures, where thermal stability is necessary or highly desirable.

An improved process for preparing open-celled microporous polymer films from non-porous, crystalline, elastic polymer starting films includes (1) cold stretching the elastic film until porous surface regions or areas which are elongated normal or perpendicular to the stretch direction are formed, (2) hot stretching the cold stretched film until fibrils and pores or open cells which are elongated parallel to the stretch direction are formed, and thereafter (3) heat setting the resulting porous film under tension, i.e., at substantially constant length, to impart stability to the film. Yet another process is similar to this process but consolidates steps (2) and (3) into a continuous, simultaneous, hot stretchingheat setting step, said step being carried out for a time sufficient to render the resulting microporous film substantially shrink resistant (less than about 15 percent).

The elastic starting film or precursor film useful in this invention is preferably prepared from crystalline polymers such as polypropylene by melt extruding the polymer into a film, taking up the extrudate at a drawdown ratio giving an oriented film, and thereafter heating or annealing the oriented film, if necessary, to improve or enhance the initial crystallinity.

The essence of the "microporous" processes is the discovery that the sequential cold stretching and hot stretching steps impart to the elastic film a unique open-celled structure which results in advantageous properties, including porosity, improved thermal stability and a further enhancement of porosity when treated with certain organic liquids such as perchloroethylene.

As determined by various morphological techniques or tests such as electron microscopy, the microporous films are characterized by a plurality of elongated, non-porous, interconnecting surface regions or areas which have their axes of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially perpendicular to them. Between the fibrils are the pores or open cells of the films utilized by the present invention. These surface pores or open cells are substantially interconnected through tortuous paths or passageways which extend from one surface region to another surface area or region.

With such a defined or organized morphological structure, the films which are treated according to the instant process may have a greater proportion of surface area that the pores cover, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

In fact, the total surface area per cubic centimeter of material of the films of this invention has a range of from 2 to about 200 square meters per cc. Preferably the range is from about 5 to about 100 square meters per cc. and most preferably from about 10 to about 80 square meters per cc. These values can be compared with normal pin-holed film which has a total surface area per gram of about 0.1 square meters; paper and fabric which have values per gram of about 1.0 square meters and leather which has a value of about 1.6 square meters per cc. Additionally, the volume of space per volume of material ranges from about 0.05 to about 1.5 cubic centimeters per gram, preferably from about 0.1 to about 1.0 cubic centimeters per gram; and most preferably from 0.2 to about 0.85 cubic centimeters per gram. Additional data to define the films of this invention relate to nitrogen flux measurements, wherein the microporous films have Q (or nitrogen) Flux values in the range of from about 5 to 400 preferably about 50 to 300. These values give an indication of porosity, with higher nitrogen flux values indicating higher levels of porosity.

Nitrogen flux may be calculated by mounting a film having a standard surface area of 6.5 square centimeters in a standard membrane cell having a standard volume of 63 cubic centimeters. The cell is pressurized to a standard differential pressure (the pressure drop across the film) of 200 pounds per square inch with nitrogen. The supply of nitrogen is then closed off and the time required for the pressure to drop to a final differential pressure of 150 pounds per square inch as the nitrogen permeates through the film is measured with a stop watch. The nitrogen flux, Q, in gram moles per square centimeter minute, is then determined from the equation:

$$Q = \frac{27.74 \times 10^3}{\Delta t \times T}$$

where $\Delta t$ is the change in time measured in seconds and T is the temperature of nitrogen in degrees Kelvin. The above equation is derived from the gas law, PV = ZnRT, wherein P is pressure; V is volume; Z is the compressibility factor; $n$ is the number of moles of gas; R is the gas constant per mole; and T is the absolute temperature.

Films useful in the process of the present invention are elastic films of crystalline, film-forming polymers. These elastic films have an elastic recovery at zero recovery time (hereinafter defined) when subjected to a standard strain (extension) of 50 percent at 25°C. and 65 percent relative humidity of at least about 40 percent preferably at least about 50 percent, and most preferably 80 percent.

Elastic recovery as used herein is a measure of the ability of a structure or shaped article such as a film to return to its original size after being stretched, and may be calculated as follows:

$$\text{Elastic Recovery(ER)} = \frac{(\text{length when stretched} - \text{length after stretching}) \times 100}{\text{Length added when stretched}}$$

Although a standard strain of 50 percent is used to identify the elastic properties of the starting films, such strain is merely exemplary. In general, such starting films will have higher elastic recoveries at strains less than 50 percent, and somewhat lower recoveries at strains substantially higher than 50 percent, as compared to their elastic recovery at a 50 percent strain.

These starting elastic films will also have a percent crystallinity of at least 20 percent, preferably at least 30 percent and most preferably at least 50 percent, e.g., about 50 to 90 percent, or more. Percent crystallinity is determined by the x-ray method described by R. G. Quynn et al. in the *Journal of Applied Polymer Science*, Vol. 2, No. 5, pp. 166–173 (1959). For a detailed discussion of crystallinity and its significance in polymers, see *Polymers and Resins*, Golding (D. Van Nostrand, 1959).

Preferred suitable starting elastic films, as well as the preparation thereof, are further defined in British Pat. No. 1,198,695, published July 15, 1970. Other elastic films which may be suitable for the practice of the present invention are described in British Pat. No. 1,052,550, published Dec. 21, 1966, and are well known in the art.

The starting elastic films utilized in the preparation of the permeable films of the present invention should be differentiated from films formed from classical elastomers such as the natural and synthetic rubbers. With such classical elastomers the stress-strain behavior, and particularly the stress-temperature relationship, is governed by an entropy-mechanism of deformation (rubber elasticity). The positive temperature coefficient of the retractive force, i.e., decreasing stress with decreasing temperature and complete loss of elastic properties at the glass transition temperature, are consequences of entropy-elasticity. The elasticity of the starting elastic films utilized herein, however, is of a different nature. In qualitative thermodynamic experiments with these elastic starting films, increasing stress with decreasing temperture (negative temperature coefficient) may be interpreted to mean that the elasticity of these materials is not governed by entropy effects but dependent upon an energy term. More significantly, the starting elastic films have been found to retain their stretch properties at temperatures where normal entropyelasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. These polymers in the form of film should generally have a percent crystallinity of at least 20 percent, preferably at least 30 percent, and most preferably about 50 percent to 90 percent or higher.

For example, a film-forming homopolymer of polypropylene may be employed. When propylene homopolymers are used, it is preferred to employ an isotactic polypropylene having a percent crystallinity as indicated above, a weight average molecular weight ranging from about 100,000 to 750,000, preferably about 200,000 to 500,000 and a melt index (ASTM-1958D-1238-57T, Part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene polymers. While both acetal homopolymers and copolymers are contemplated, the preferred acetal polymer is a "random" oxymethylene copolymer, one which contains recurring oxymethylene, i.e., —CH$_2$—O—, units interspersed with —OR— groups in the main polymer chain where R is a divalent radical containing at least two carbon atoms directly linked to each other and positioned on the chain between the two valences, and with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form should also have a crystallinity of at least 20 percent, preferably at least 30 percent, and most preferably at least 50%, e.g., 50 to 60 percent or higher. Further, these polymers have a melting point of at least 150°C., and a number average molecular weight of at least 10,000. For a more detailed discussion of acetal and oxymethylene polymers, see *Formaldehyde*, Walker, pp. 175–191, (Reinhold 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and are not described further herein for the sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The term "withdrawn ratio" or, more simply, "draw ratio", as used herein is the ratio of the film wind-up or take-up speed to the speed of the film issuing at the extrusion die.

The melt temperature for film extrusion is in general no higher than about 100°C. above the melting point of the polymer and no lower than about 10°C. above the melting point of the polymer.

For example, polypropylene may be extruded at a melt temperature of about 180°C. to 270°C., preferably 200°C. to 240°C. Polyethylene may be extruded at a melt temperature of about 175°C. to 225°C., while acetal polymers, e.g., those of the type disclosed in U.S. Pat. No. 3,027,352 may be extruded at a melt temperature of about 185°C. to 235°C., preferably 195°C. to 215°C.

The extrusion operation is preferably carried out with rapid cooling and rapid drawdown in order to obtain maximum elasticity. This may be accomplished by having the take-up roll relatively close to the extrusion slot, e.g., within two inches and, preferably, within one inch. An "air knife" operating at temperatures between, for example 0°C. and 40°C., may be employed within one inch of the slot to quench, i.e., quickly cool and solidify the film. The take-up roll may be rotated, for example, at a speed of 10 to 100 ft/min., preferably 50 to 500 ft/min.

While the above description has been directed to slot die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through an annulus to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of the extruded tubular film so as to provide quick and effective cooling. Means such as a cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_1/D_2$ ratio, for example, is from 0.5 to 6.0 and preferably about 1.0 to about 2.5, and the take-up speed, for example is 30 to 700 ft/min. The melt temperature may be within the ranges given previously for slot extrusion.

The extruded film may then be initially heat treated or annealed in order to improve crystal structure, e.g., by increasing the size of the crystallites and removing imperfections therein.

The resulting partly-crystalline film can then be corona treated as described hereinafter or rendered microporous and then subjected to corona treatment. In fact, if desired, corona treated fibers can also be rendered microporous as described hereinafter. In order to render either the corona treated or untreated precursor or starting film microporous, it is subjected to a process generally comprising the steps of stretching until micropores are formed and heat setting to stabilize the thus formed pores of the starting film. Preferably the process comprises either the consecutive steps of cold stretching, hot stretching and heat setting or the steps of cold stretching and simultaneously hot stretching and heat setting the precursor film. Other variations on this process (such as elimination of the hot stretching step) can be carried out resulting in microporous films which, although slightly inferior to those films made by the cold stretch - hot stretch - heat set process, still find utility as the microporous films of this invention.

The term "cold stretching" as used herein is defined as stretching or drawing a film to greater than its original length and at a stretching temperature, i.e., the temperature of the film being stretched, less than the temperature at which the melting of the film begins when the film is uniformly heated from a temperature of 25°C. at a rate of 20°C. per minute. The term "hot stretching" or "hot stretching-heat setting" as used herein is defined as stretching above the temperature at which melting begins when the film is heated from a temperature of 25°C. at a rate of 20°C. per minute, but below the normal melting point of the polymer, i.e., below the temperature at which fusion occurs. For example, using polypropylene elastic film, cold stretching is carried out preferably below about 120°C. while hot stretching or hot stretching-heat setting is carried out above this temperature.

When a separate heat setting step is employed it follows the cold stretching - hot stretching steps and is carried out from about 125°C. up to less than the fusion temperature of the film in question. For polypropylene the range preferably is about 130°C. to 160°C.

The total amount of stretching or drawing which should occur when either a single stretching or consecutive stretching steps occur is in the range of about 10 to about 300 percent of the original length of the film prior to stretching.

The resulting microporous film exhibits a final crystallinity of preferably at least 30 percent, more preferably about 50 to 100 percent as determined by the aforementioned x-ray method and as previously defined an elastic recovery from a 50% extension of at least 50%, preferably 60 to 85%. Furthermore, this film exhibits an average pore size of about 100 to 12,000 Angstroms more usually 150 to 5,000 Angstroms, the values being determined by mercury porosimetry as described in an article by R. G. Quynn et al., on pages 21–34 of *Textile Research Journal*, January 1963. It is, of course, recognized that the above pore size range applies only to those pores resulting from the microporous production process. Those pores prepared by the corona discharge treatment process are, of course, much larger. It will be appreciated from FIGS. 3 *a* and *b* that the holes introduced by the corona discharge treatment range up to about 20$\mu$, usually up to about 10$\mu$.

The increased pore size and permeability of the films of this invention are accomplished by treating either a microporous film precursor (as described hereinabove) or the microporous film itself with a corona discharge treatment.

Broadly speaking the corona discharge treatment of either the precursor or microporous films of this invention is accomplished by passing the film to be treated through a corona formed by an electrode which is extended across the film and a second discharge electrode which is situated in a similar relationship to said first electrode but on the opposite side of the film. There is applied across the electrodes an alternating high energy electrical current sufficient to provide areas of concentrated electrical energy which have sufficient energy to perforate said film.

The spacing and pattern of the corona perforation can be controlled by periodically interrupting the current supply to the corona discharge electrode or by interposing a pattern insulating material between the corona electrode and the film.

Preferably the frequency of the current supplied to the corona electrode is in the range of 10 to 1,000 kc., more preferably 1,000 to 300,000 kc. The voltage and current are variable over a wide range. However, the voltage required to perforate a given thickness of microporous film or precursor film is considerably below that required for a corresponding thickness of regular non-elastic non-porous polyolefinic film. For example, using 1 mil polypropylene film a minimum of about 12 – 13 kv. are required for perforation of either the crystalline, elastic precursor or the microporous film. However, using unmodified polypropylene film of a similar thickness the perforation voltage is at least 17 kv. Suitable current is usually in excess of about 0.5 amps, preferably about 1.0 to 1.5 amps. The space between the two electrodes (the corona electrode and the discharge electrode) is generally less than 1 inch preferably about one-half to one-fourth inch although the space largely depends upon the voltage applied across the two electrodes.

Numerous shapes and types of electrodes have been employed for corona treatment. Any electrode shape or size may be employed herein which will produce a corona between the electrodes over the transverse portion of the film desired to be perforated. A suitable electrode is a simple piece of 18 gauge black iron about 2 inches wide and of the required length. The discharge end should be cut in a good sheet metal shear and sanded to remove burrs. Using nylon bolts to prevent stray corona, the strip is preferably bolted to a piece of electrical grade micarta and mounted at a proper distance from the grounded electrode roll. The grounded roll is connected to the ground on the generator terminal.

As set forth above, corona discharge treatment may be applied to the films of this invention at any point in the film production process after the precursor film has been formed. However, preferably the film of this invention is subjected to corona discharge treatment after the last step in the microporous treatment process.

Thus, the precursor film can be subjected to corona discharge and then cold stretched, hot stretched and heat set. In variation corona discharge treatment can occur between the cold stretching and hot stretching sections or between the hot stretching and heat setting steps. In fact, if desired corona treatment could be applied simultaneously within the typical microporous film preparation steps described above, which occur subsequent to precursor film preparation.

When prepared, the corona treated films of this invention exhibit a permeability which is greater than that of untreated microporous films. At the same time, however, when regular non-porous films are subjected to corona treatment (and such a treatment requires usually about 30 to 70 percent more voltage to achieve permeability) an uncontrolled increase in permeability occurs. Thus, no intermediate permeability film is possible when non-porous films are subjected to corona treatment. But when the microporous films or precursor films described herein are subjected to such treatment, a controlled increase in permeability is possible. Furthermore, it is thought that the relative pore size of the pores of the corona treated non-porous films is much greater than is the pore size of the comparable pores in the microporous films which have been subjected to corona treatment.

The films of the instant invention are useful in sterile packaging, burn dressings, membranes and the like. Such films can be used as filter membrane supports, filter flow control devices, etc. Furthermore, these films are useful in areas where permeabilities and pore sizes which are larger than those exhibited by normal microporous films are needed, i.e., in instances where increased passage of water or bacteria is desirable. These films are also useful where pore sizes smaller than either pin-punched or corona treated non-porous films are desired.

An appreciation of the film products of the invention compared to the prior art microporous films may be gained from an inspection of the Figures.

Figure 1B:
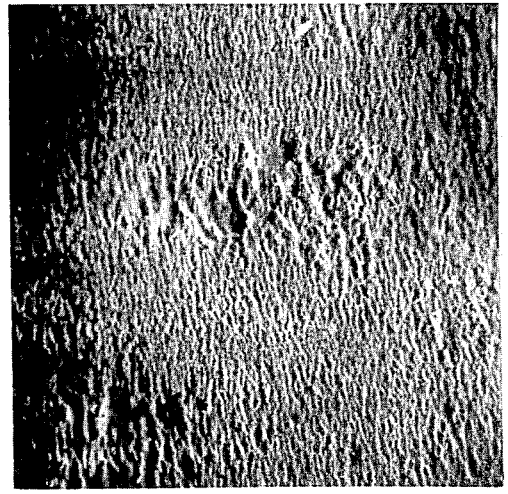

FIGS. 1a and 1b are scanning electron micrographs of prior art microporous polypropylene films which may be produced in accordance with the method of Example I. FIG. 1a is at a magnification of 2600X and FIG. 1b at 5500X. In FIG. 1b the micropores are just about visible.

FIG. 2 is a scanning electron micrograph of corona treated micorporous polypropylene film at a magnification of 264X. A corona-perforation is visible at the upper right. The corona-treatment is in accordance with the process of Example II.

FIGS. 3a (2600X) and 3b (6600X) show that coronaperforation at greater magnifications.

The following examples are illustrative of the present invention and are not intended to limit the same in any manner.

EXAMPLE I

Crystalline polypropylene having a melt index of 0.7 and a density of 0.92 was melt extruded at 230° C. through an 8 inch slot die of the coat hanger type using a 1 inch extruder with a shallow metering screw. The length to diameter ratio of the extruder barrel was 24/1. The extrudate was drawndown very rapidly at a melt drawdown ratio of 150, and contacted with a rotating casting roll maintained at 50°C. and 0.75 inch from the lip of the die. The film produced in this fashion was found to have the following properties: thickness, 0.001 inch; recovery from 50 percent elongation at 25°C., 50.3 percent; crystallinity, 59.6 percent.

A sample of this film was oven annealed with air with a slight tension at 140°C. for about 30 minutes, removed from the oven and allowed to cool. The resulting precursor film was then found to have the following properties: recovery from a 50 percent elongation at 25°C., 90.5 percent; crystallinity 68.8 percent.

Samples of the annealed elastic precursor film were then cold stretched at 20% ambient temperature and thereafter hot stretched at 80% and heat set under tension, i.e., at constant length, at 145°C. for 10 minutes in air. The total draw was 100 percent, based on the original length of the elastic film.

EXAMPLE II 4.5 square inch samples of the microporous film prepared above were subjected to a corona discharge treatment using a variable voltage Tesla coil. This treatment was accomplished by holding the discharge electrode of the Tesla coil about one-half inch from a sample of the film which had been placed over a grounded metal plate. The discharge was then moved slowly over the entire area of the sample, treating the sample at the rate of about 3–5 seconds per square inch of film.

Samples prepared at various voltages were then evaluated for permeability using a Gurley densometer according to ASTM No. D726: the sample was inserted into the densometer and a one inch square portion thereof was subjected to a pressure of 12.2 inches of water. The time required to pass 10cm$^3$ of air under this pressure through the one inch square portion of the sample was recorded in seconds as a measure of permeability. The greater the number of seconds required to pass the set volume of air, the less the permeability.

| Voltage | Pore Size ($\mu$) | Permeability (sec.) |
|---------|-------------------|---------------------|
| 11,800  | 5                 | 24                  |
| 12,500  | 10                | 18                  |
| 13,000  | 15                | 6                   |
| 15,000  | 20                | 2                   |

EXAMPLE III

A sample of the annealed elastic precursor film prepared in Example I was subjected to corona treatment according to the procedure of Example II and then subjected to cold stretching and hot stretching according to the process in Example I. The resulting film, which was approximately 0.001 inch thick, was evaluated according to the test method of Example II.

| Voltage | Pore Size (μ) | Permeability (sec.) |
|---------|---------------|---------------------|
| 13,000  | 5             | 41                  |
| 13,500  | 5             | 19                  |
| 14,000  | 5             | 17                  |
| 15,000  | 10            | 17                  |

EXAMPLE IV

A sample of standard, non-porous non-elastic 0.001 inch thick polypropylene film (Avisun 36T, 0.9 density, non-oriented [as described in their bulletin]) was subjected to corona treatment and evaluated using the procedures of Example II.

| Voltage | Pore Size (μ) | Permeability (sec.) |
|---------|---------------|---------------------|
| 18,000  | 10            | 7                   |
| 17,000  | 10            | 9                   |
| 16,000  | —             | Not permeable       |

As can be seen from the above Examples III and IV using films having the same thickness, a substantially greater voltage is required to achieve corona perforation of non-porous films than is required for microporous films or their crystalline, elastic precursor films. Furthermore, once perforation has occured with the standard non-porous film, the permeability and pore sizes are quite large, much more so than the permeability and pore sizes of microporous films or their crystalline, elastic precursor films which have been similarly treated.

EXAMPLE V

Areas of unannealed elastic precursor film produced as described in Example I were corona treated in the manner described in Example II. Holes were visible where the discharge had gone through the film. The Gurley values for the treated film areas were:

| Sample 1 | 44 seconds |
| Sample 2 | 90 seconds |

These film samples were annealed and stretched in accordance with the method of Example I. Gurley values in the corona treated areas were:

| Sample 1 | 14, 5, 14, 8 seconds |
| Sample 2 | 7, 10, 5, 7 seconds  |

Gurley values in the areas which had not been corona treated were 24 and 23 seconds.

Observation of the corona-formed holes (by eye) indicated that they had been opened up in the stretching process as shown by their shapes which had become elliptical as compared to a round shape initially.

It will be obvious from the Examples that the Gurley densometer method may be used in place of the Nitrogen flux method described above in measuring permeability of the films. Indeed, it is possible to work out a correlation of values in the two systems by merely determining them by each method on a single sample. Gurley values obtained by the present invention will in general be similar to those in the above Examples but will differ, of course, with differences in film thickness. In general Gurley values will range from about 5 to about 500 seconds.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A process for preparing a microporous film selected from the group consisting of polyolefins, polyacetal homopolymers and copolymers, polyalkylene sulfides, polyarylene oxides, polyamides and polyesters of increased porosity and pore size which comprise subjecting to a corona discharge treatment a crystalline non-porous elastic starting film having an elastic recovery when subjected to a 50 percent extension at 25°C. and 65 percent relative humidity of at least about 40 percent, and a percent crystallinity of at least 20 percent, said corona discharge treatment sufficient to perforate said film with holes of up to about 20 microns, said corona discharge carried out using a voltage of up to about 15,000 volts, and rendering said corona-treated film microporous by a series of steps which comprise cold stretching the film to a length 10 to 300 percent of its original length at a temperature less than the temperature at which melting of the film begins and heat setting.

2. The process of claim 1 wherein after cold stretching the film is hot stretched 10 to 300% of its original length at a temperature above the temperature at which melting begins, the total cold and hot stretching being within 10 to 300% of the original length.

3. The process of claim 1 wherein said starting film has a thickness of about 0.005 to 0.01 inch.

4. The process of claim 1 wherein said film is polypropylene.

5. The process of claim 1 wherein said film is polyethylene.

6. The process of claim 1 wherein said film is a polyacetal homopolymer or copolymer.

7. The process of claim 1 wherein said corona discharge is carried out at a voltage in the range of between about 13,000 and 15,000 volts.

8. The process of claim 7 wherein said corona discharge treatment of said film occurs at a rate of about 3 to 5 seconds per square inch of film.

* * * * *